US010259270B2

(12) United States Patent
D'Oria et al.

(10) Patent No.: US 10,259,270 B2
(45) Date of Patent: Apr. 16, 2019

(54) METHOD OF SELECTIVELY CONTROLLING THE SELF-SEALING ABILITY OF A TYRE AND SELF-SEALING TYRE FOR VEHICLE WHEELS

(71) Applicant: Pirelli Tyre S.p.A., Milan (IT)

(72) Inventors: Francesco D'Oria, Milan (IT); Gianni Mancini, Milan (IT); Cristiano Puppi, Milan (IT); Enrico Sabbatani, Milan (IT); Giovanni Simonato, Milan (IT)

(73) Assignee: PIRELLI TYRE S.P.A, Milan (IT)

( * ) Notice: Subject to any disclaimer, the term of this patent is extended or adjusted under 35 U.S.C. 154(b) by 349 days.

(21) Appl. No.: 14/824,680

(22) Filed: Aug. 12, 2015

(65) Prior Publication Data
US 2016/0068029 A1    Mar. 10, 2016
US 2017/0036496 A9    Feb. 9, 2017

Related U.S. Application Data

(62) Division of application No. 13/511,391, filed as application No. PCT/IB2010/055260 on Nov. 18, 2010, now Pat. No. 9,908,371.
(Continued)

(30) Foreign Application Priority Data

Nov. 25, 2009    (IT) .............................. MI2009A2067

(51) Int. Cl.
    *B29D 30/06*      (2006.01)
    *B60C 17/10*      (2006.01)
    (Continued)

(52) U.S. Cl.
    CPC .............. *B60C 17/10* (2013.01); *B29C 73/20* (2013.01); *B29D 30/0685* (2013.01); *B60C 5/14* (2013.01);
(Continued)

(58) Field of Classification Search
CPC ...................................... B29D 30/0685; B29D 2030/0686–2030/0698; B60C 19/12; B60C 19/122; B29C 73/16; B29C 73/163
See application file for complete search history.

(56) References Cited

U.S. PATENT DOCUMENTS 4,057,090 A    11/1977    Hoshikawa et al.
4,228,839 A *    10/1980    Böhm ................ B29D 30/0005
                                                                                                                                                  152/504
(Continued)

FOREIGN PATENT DOCUMENTS

CN           1553866 A      12/2004
CN         101139516 A      3/2008
(Continued)

OTHER PUBLICATIONS

International Search Report from the European Patent Office for International Application No. PCT/IB2010/055260, dated Mar. 22, 2011.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method of selectively controlling the self-sealing ability of a tyre obtained by application of a sealing assembly on a drum and subsequent formation thereon of a precursor of a green tyre inclusive of liner and carcass, followed by shaping, curing and molding. The sealing assembly includes: a self-supporting thermoplastic film of polyamide or polyester and a layer of sealing material possessing viscoelasticity and stickiness features, which is associated with and supported by the self-supporting thermoplastic film. The sealing assembly is easily puncturable by a sharp-pointed element while it maintains such a deformability and stickiness that it helps in the transfer of the sealing material during ejection
(Continued)

of the sharp-pointed element and limits the transferred material amount to such an extent that holes bigger than a predetermined value are not sealed.

18 Claims, 2 Drawing Sheets

Related U.S. Application Data

(60) Provisional application No. 61/301,359, filed on Feb. 4, 2010.

(51) Int. Cl.
    *B60C 19/12*     (2006.01)
    *B29C 73/20*     (2006.01)
    *B60C 5/14*     (2006.01)
    *B29K 67/00*     (2006.01)
    *B29K 77/00*     (2006.01)

(52) U.S. Cl.
CPC ............ *B60C 19/12* (2013.01); *B60C 19/122* (2013.01); *B29D 2030/069* (2013.01); *B29D 2030/0695* (2013.01); *B29K 2067/00* (2013.01); *B29K 2077/00* (2013.01); *Y10T 152/10666* (2015.01)

(56) References Cited

U.S. PATENT DOCUMENTS

| | | |
|---|---|---|
| 4,359,078 A | 11/1982 | Egan |
| 4,664,168 A | 5/1987 | Hong et al. |
| 5,085,942 A | 2/1992 | Hong et al. |
| 6,399,697 B1 | 6/2002 | Takasaki et al. |
| 6,626,218 B1 | 9/2003 | Ochiai et al. |
| 6,739,365 B1 | 5/2004 | Makino |
| 2004/0103967 A1 | 6/2004 | Majumdar et al. |
| 2004/0149366 A1 | 8/2004 | Makino et al. |
| 2004/0194862 A1 | 10/2004 | Fukutomi et al. |
| 2006/0293454 A1 | 12/2006 | Nadella et al. |
| 2008/0078489 A1 | 4/2008 | Fukutomi et al. |
| 2009/0084483 A1 | 4/2009 | Majumdar et al. |
| 2009/0283192 A1 | 11/2009 | Sekiguchi |
| 2010/0300593 A1 | 12/2010 | Merino Lopez et al. |
| 2012/0234449 A1 | 9/2012 | Greiveldinger et al. |
| 2012/0316288 A1 | 12/2012 | Giles et al. |

FOREIGN PATENT DOCUMENTS

| | | |
|---|---|---|
| CN | 101516645 A | 8/2009 |
| CN | 101563417 A | 10/2009 |
| EP | 0 189 303 | 7/1986 |
| EP | 1 099 573 A1 | 5/2001 |
| EP | 1 174 290 A1 | 1/2002 |
| EP | 1 435 301 A1 | 7/2004 |
| EP | 2 045 103 A1 | 4/2009 |
| FR | 2886581 A1 | 12/2006 |
| JP | 2009/269446 | 11/2009 |
| JP | 2009-269446 A * | 11/2009 |
| WO | WO 2009/000742 A1 | 12/2008 |
| WO | WO 2009/000744 A1 | 12/2008 |
| WO | WO 2009/006915 A1 | 1/2009 |

OTHER PUBLICATIONS

Chinese Office Action and Search Report for related CN Appln No. 201080053085.X, dated Dec. 27, 2013.
Translation of Official Decision of Grant from Russian Federation, dated Oct. 21, 2014 for counterpart patent application No. 2012121563/05(032617).
English language abstract for JP2009-269446.
Data sheet for Shell Catenex SNR, dated Jan. 10, 2000.

* cited by examiner

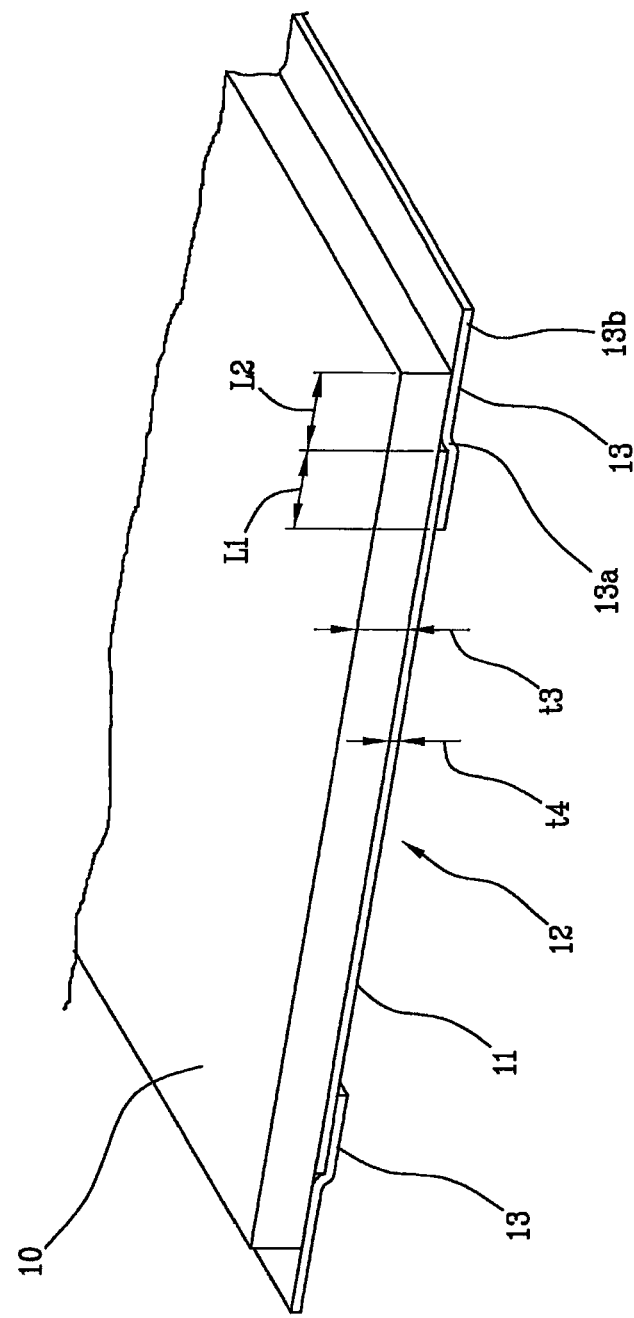

METHOD OF SELECTIVELY CONTROLLING THE SELF-SEALING ABILITY OF A TYRE AND SELF-SEALING TYRE FOR VEHICLE WHEELS

CROSS REFERENCE TO RELATED APPLICATIONS

This is a division of Application No. 13/511,391, filed May 23, 2012, which is a national phase application based on PCT/IB2010/055260, filed Nov. 18, 2010, which claims the priority of Italian Patent Application No. MI2009A002067, filed Nov. 25, 2009, and the benefit of U.S. Provisional Application No. 61/301,359, filed Feb. 4, 2010, the content of all of which is incorporated herein by reference.

BACKGROUND OF THE INVENTION

Field of the Invention

The present invention relates to a method of selectively controlling the self-sealing ability of a tyre and to a self-sealing tyre for vehicle wheels.

Description of the Related Art

A tyre for vehicle wheels generally comprises a carcass structure associated with a belt structure. A tread band is applied at a radially external position to the belt structure. The green tyre is build through assembly of respective semi-finished products of an elastomeric blend.

After building of the green tyre carried out by assembly of respective components, a curing and molding treatment is generally carried out which aims at determining the structural stabilisation of the tyre through cross-linking of the elastomeric compositions and also at impressing it with a desired tread pattern and possible distinctive graphic marks at the sidewalls.

Self-sealing tyres are known that are able to delay or prevent the escape of air and the consequent tyre deflation due to a puncture caused by a sharp-pointed object (a nail, for example). In order to obtain this result, a self-sealing tyre comprises at least one layer of sealing polymeric material that can adhere to the object inserted therein and can further flow into the puncture or hole when this object is removed, thereby sealing the hole itself and preventing the escape of air from the tyre. This material inside the finished (cured and molded) tyre must be deformable and sticky.

Document EP 1 435 301 discloses a self-sealing tyre obtained by disposing an elastomeric composition, containing 0.2 to 20 parts by weight of a peroxide based on 100 parts by weight of an elastomer containing not less than 50% by weight of polyisobuthylene, at an inner surface of an uncured tyre. In an embodiment, a film of thermoplastic resin is disposed on a radially internal side of the sealing layer. The thickness of the thermoplastic-resin film is included between 0.05 mm and 0.3 mm. The elastomeric composition is heated during the tyre curing, causing a reaction involving decomposition of the polyisobutylene and formation of an elastomeric sealing layer.

SUMMARY OF THE INVENTION

According to the present invention it has been found that self-sealing of the tyre in operation is not a mere problem of sealing a hole caused by a sharp-pointed element. It is the Applicant's perception that self-sealing is a problem of selective control of the sealing itself, in order to exclude the repair of punctures having the effect of weakening the tyre structure.

According to the present invention, the problems connected with self-sealing are not mainly those of ensuring a long running but rather those of ensuring a safe use of the punctured and self-repaired tyre.

To the aims of this invention it has been seen that an uncontrolled or unselective self-repair runs the risk of giving the vehicle's driver a false feeling of safety that will involve dangers in the vehicle handling.

In particular, the Applicant has perceived that, should the sharp-pointed element have produced a puncture of big sizes and at all events beyond a given predetermined diameter, this puncture might have caused the structural weakening of the tyre to such an extent that self-sealing of the puncture, on ejection of the sharp-pointed element from the tyre, could not enable the driver to become aware of the extent or importance of the damage suffered by the tyre. Consequently, under this situation, the tyre could no longer ensure reliability and continuity in the performance of use. For instance, it is the Applicant's opinion that punctures produced by sharp-pointed elements of an 8 mm diameter or higher can cause structural damages to the tyre capable of jeopardising a safe running.

The Applicant has found that it is possible to selectively control the self-sealing ability of a tyre mounted on a vehicle wheel and punctured by a sharp-pointed element such as a nail or the like, in particular when said nail exits the tyre, through a sealing assembly comprising a layer of a predetermined thickness of sealing material in association with a thermoplastic thin film. Said thermoplastic film has structural features involving support of said sealing material, resistance to the temperatures typical of curing and sufficient viscoelasticity to enable it to become deformed during shaping and during curing/molding of the tyre.

Preferably, the thermoplastic thin film also has air-tightness features and/or easy pierceability features in case of puncturing by a sharp-pointed object.

More specifically, in a first aspect, the present invention relates to a method of selectively controlling the self-sealing ability of a tyre, said method including:

arranging a sealing assembly on a drum and, subsequently, forming a precursor of a green tyre inclusive of at least one liner and a carcass on said sealing assembly and subsequently, shaping, moulding and curing the combined sealing complex and tyre precursor, such a sealing assembly comprising:

i. a self-supporting thermoplastic film of polyamide or polyester;

ii. a layer of sealing material possessing viscoelasticity and stickiness features, which is associated with and supported by said self-supporting thermoplastic film;

said sealing assembly being easily puncturable by a sharp-pointed element while maintaining such a deformability and stickiness that it contributes to transfer of the sealing material during ejection of the sharp-pointed element and limits the transferred amount thereof to such an extent that holes bigger than a predetermined value are not sealed.

In a second aspect, the present invention relates to a self-sealing tyre for vehicle wheels, comprising:

at least one carcass ply, a tread band applied at a radially external position to said carcass ply at a crown region, at least one liner applied at a radially internal position to said carcass ply, a sealing assembly applied at a position radially internal to the liner and axially extending at least over the whole crown region of the tyre;

wherein said sealing assembly comprises a self-supporting thermoplastic film of a polyamide or polyester material, a layer of sealing material associated with and supported by said self-supporting thermoplastic film;

wherein the self-supporting thermoplastic film is radially internal to the layer of sealing material and said layer of sealing material is placed directly in contact with the liner;

wherein said self-supporting thermoplastic film has a thickness smaller than 50 μm;

wherein said sealing layer has a maximum thickness smaller than about 6 mm.

Said assembly is placed in the radially innermost position of the tyre so as to cover the whole circumference thereof over a radial (or transverse) extension interesting at least all the crown region thereof.

The tensile features (to be expressed within the shaping and curing/molding scope) and the thickness of the self-supporting thermoplastic film, as well as the viscoelasticity and stickiness features of the sealing material and the thickness of same must ensure that the assembly will react to the exit of the puncturing element by a selective sealing action avoiding punctures to be sealed when they are bigger than a predetermined value in relation to the sizes of the tyre and the tyre destination of use.

The sealing ability of the material referred to in the present invention is in relation both with the viscoelastic features and stickiness thereof: the former enables flowing of the material inside the puncture and the latter gives the material the dragging force that is exerted thereon by contact with the sharp-pointed element in movement.

Within the scope of the present invention, the assembly must be easily pierceable by a sharp-pointed element puncturing the tyre, while maintaining a flexibility adapted to help in controlling transfer of the sealing material once the sharp-pointed element is ejected from the tyre, in particular in use.

Specifically, the Applicant's experiences show that at the moment the sharp-pointed element punctures the tyre, the punctured sealing assembly will form, by eversion towards the inside of the tyre, a sort of bulge around the puncturing element. The same experiences show that the punctured radially-innermost layer (thin thermoplastic film) of the assembly, substantially follows the puncturing element, together with the sealing material, during ejection thereof, being turned inside out thereby forming a sort of crater with inner concavity. As a result of tests carried out by the Applicant, it appears that a thinner thermoplastic film is not so capable of following the flow of the sealing material during ejection of the sharp-pointed element. It is even believed that the thin film since it is deformable, exerts a control on the maximum amount of sealing material following the sharp-pointed element during ejection of the latter, this being connected with the thickness of this sealing material and the viscoelasticity and stickiness qualities of said material.

The present invention, in at least one of the above aspects, can exhibit one or more of the preferred features hereinafter described.

Preferably, said self-supporting thermoplastic film is made of a polyamide selected from: nylon 6, nylon 66, nylon 46, nylon 11, nylon 12, nylon 610, nylon 612, nylon 6/66 copolymer, nylon 6/66/610 copolymer, nylon MXD 6, nylon 6T, nylon 6/6T copolymer, nylon 66/PP copolymer, nylon 66/PPS copolymer, used alone or in combination thereof.

Preferably, said self-supporting thermoplastic film is made of a polyester selected from: polybutylene terephthalate (PBT), polyethylene terephthalate (PET), polyethylene isophtalate (PEI), polybutylene terephthalate/tetramethylene glycol copolymer, PET/PEI copolymer, polyarylate and polybutylene naphthalate.

Preferably, the self-supporting thermoplastic film has an elongation at yield greater than 5%.

Preferably, the self-supporting thermoplastic film has an elongation at yield not exceeding 30%.

Preferably, the self-supporting thermoplastic film has a yield strength comprised from about 20 MPa to about 60 MPa, evaluated following the ASTM D882 standard.

Preferably, the self-supporting thermoplastic film has an ultimate elongation greater than 70%.

Preferably, the self-supporting thermoplastic film has an ultimate tensile strength comprised from about 20 MPa to about 150 MPa.

To the aims of the present invention, the elongation and strength features are evaluated by a tensile stress test carried out following the ASTM D882 standard.

According to the Applicant's experiences, after shaping, the thermoplastic film remains in a deformed state imposed by the new geometry. The film reaction to this imposed deformation is of the viscoelastic type: that is to say, a stress is produced that counteracts deformation and decreases in time. The Applicant has perceived that this stress decrease must be quick to prevent an excessive elastic stress from operating in such a manner as to deform the green tyre or from causing separation of the radially internal layers.

Preferably, the self-supporting thermoplastic film has such a stress relaxation referred to time, that in the 10 first seconds following achievement of an imposed predetermined elongation the thermoplastic film shows a reduction of at least 20% of the stress necessary for maintaining such an imposed elongation.

Preferably, the self-supporting thermoplastic film has such a stress relaxation referred to time that within the 300 seconds following achievement of an imposed predetermined elongation the thermoplastic film shows a reduction of at least 35% of the stress necessary for maintaining such an imposed elongation.

To the aims of the present invention, the term "stress relaxation" refers to the stress or load/strength measured after a thermoplastic film sample has been elongated to speeds in the order of those carried out during shaping (500 mm/min, for example), up to a predetermined elongation value, and maintained to such a length for a predetermined time, 5 minutes (300 s), for example. The stress relaxation with an imposed deformation is expressed as the percent load reduction relative to the starting load, the predetermined elongation in the predetermined time being maintained.

The stress relaxation is determined by calculating the percent reduction of the starting load measured after elongation of the sample at a 500 mm/min speed up to the predetermined length between 110% and 150%, the starting length being considered as 100%, the sample being maintained to such a length and said reduction being measured at 10 seconds and 300 seconds.

Preferably, said self-supporting thermoplastic film before shaping has a thickness smaller than 50 μm.

Preferably, said self-supporting thermoplastic film before shaping has a thickness comprised from about 10 μm to about 30 μm.

During building of the tyre carcass, first the sealing assembly is applied on the building drum according to an annular form obtained by a joint at the ends of the sealing assembly. The following toroidal conformation of the carcass structure and the sealing assembly radially internal thereto involves a radial expansion both of the layer of sealing material and of the self-supporting thermoplastic film. The above mentioned size and material features relating to the self-supporting thermoplastic film are of such a nature that the elastoplastic deformation is allowed without the film or joint being broken, during the tyre shaping. The sealing assembly therefore must be able to follow the extension and shape of such a conformation. The above mentioned features of said film are suitable to keep it unimpaired (the film does not melt) during curing of the tyre.

The above mentioned features of said film in addition enable it to bear its own weight and that of the sealing layer disposed thereon without becoming deformed during transport of the sealing assembly, to the building drum on which it has to be applied, for example. The sealing-material layer in fact becomes deformed under its own weight if it does not rest on a support.

Preferably, said layer of sealing material before shaping has a thickness smaller than about 6 mm.

Preferably, said layer of sealing material before shaping has a thickness greater than about 3 mm.

Preferably, the sealing material comprises:
- 40 phr to 80 phr, preferably 50 phr to 70 phr, of a synthetic or natural elastomer material;
- 20 phr to 60 phr, preferably 30 phr to 50 phr, of an elastomeric block copolymer, preferably a styrene-butadiene elastomer (SBR);
- 40 phr to 60 phr, preferably 50 phr to 60 phr, of process oil;
- 15 phr to 60 phr, preferably 20 phr to 40 phr, of at least one tackiness agent; and
- 1 phr to 40 phr, preferably 5 phr to 30 phr, of at least one reinforcing filler.

The composition and thickness of the sealing-material layer are selected, preferably within the above mentioned features, in relation to the type of tyre to be produced so as to supply the optimal viscoelasticity and stickiness features for each use condition of the tyre. In fact, the Applicant took care to apply the invention to tyres for four-wheeled vehicles for use on the road, such as tyres adapted to equip medium- and high-powered cars for people transport (measures of the chord 195 mm to 245 mm), but without any prejudice the invention is also suitable for tyres of small runabouts or for high-performance (HP) and ultra-high-performance (UHP) tyres, the chord of which measures 145 mm to 295 mm, for example. If the appropriate adjustments are made, the present invention can apply to tyres for different vehicles such as motorcycles or heavy transport means for persons and things.

Preferably, in the finished tyre, said self-supporting thermoplastic film has a thickness smaller than about 25 µm.

Preferably, in the finished tyre, said self-supporting thermoplastic film has a thickness greater than about 5 µm.

Preferably, in the finished tyre, said self-supporting thermoplastic film has a resistance to puncturing lower than about 30N.

Preferably, in the finished tyre, said self-supporting thermoplastic film has a resistance to puncturing lower than about 15N, more preferably lower than about 10N.

To the aims of the present invention, the resistance to puncturing is evaluated by a test carried out following the ASTM F1306 standard.

Preferably, in the finished tyre, said layer of sealing material has a maximum thickness greater than about 2.5 mm.

The optimal selective sealing of the sealing assembly according to the invention has been obtained with the film parameters pointed out above. Operation of this assembly is not known. It was found by chance, in a successful example thereof, when a nylon film of a 200 micron thickness was replaced with a 18 micron film. In fact, before the present invention, it was believed that a film thickness lower than 50 microns would have not allowed the material to be sealed due to the probable breaking of the film carrying the sealing material. Having found the contrary was a surprise for the Applicant who so far is unable to explain the mechanism with certainty, but can only make reference to that which was observed during the tests.

Preferably, the tyre comprises two elongated elements of elastomeric material each applied at a respective circumferential edge of the sealing assembly. Each elongated element of elastomeric material has an axially internal portion disposed radially internal to the sealing assembly and in contact with said sealing assembly and an axially external portion disposed in contact with the liner.

Preferably, the layer of sealing material has an axial extension greater than the axial extension of the self-supporting thermoplastic film and wherein each elongated element of elastomeric material is directly in contact with said layer of sealing material and said self-supporting thermoplastic film.

The elongated elements ensure side adhesion of the sealing assembly to the liner.

The axially opposite edges of the self-supporting thermoplastic film are maintained sticking to the sealing material by overlapping of each elongated element adhering to the respective side end of the sealing material itself.

The lateral elongated elements of elastomeric blend contain the material during shaping and curing of the tyre, when the inner pressure of the mold presses the carcass against the inner walls of the mold itself.

In addition, the elongated elements during shaping of the tyre prevent the self-supporting thermoplastic film from separating from the sealing material at the axially opposite circumferential edges thereof.

Further features and advantages will become more apparent from the detailed description of a preferred but not exclusive embodiment of a method of selectively controlling the sealing of punctures in a self-sealing tyre for vehicle wheels and of a self-sealing tyre for vehicle wheels in accordance with the present invention.

BRIEF DESCRIPTION OF THE DRAWINGS

This description will be set out hereinafter with reference to the accompanying drawings, given by way of non-limiting example, in which:

FIG. 2 shows a sealing assembly associated with two elongated elements of elastomeric material and designed to form part of the self-sealing tyre seen in FIG. 1.

DETAILED DESCRIPTION OF THE INVENTION

Figure 1:
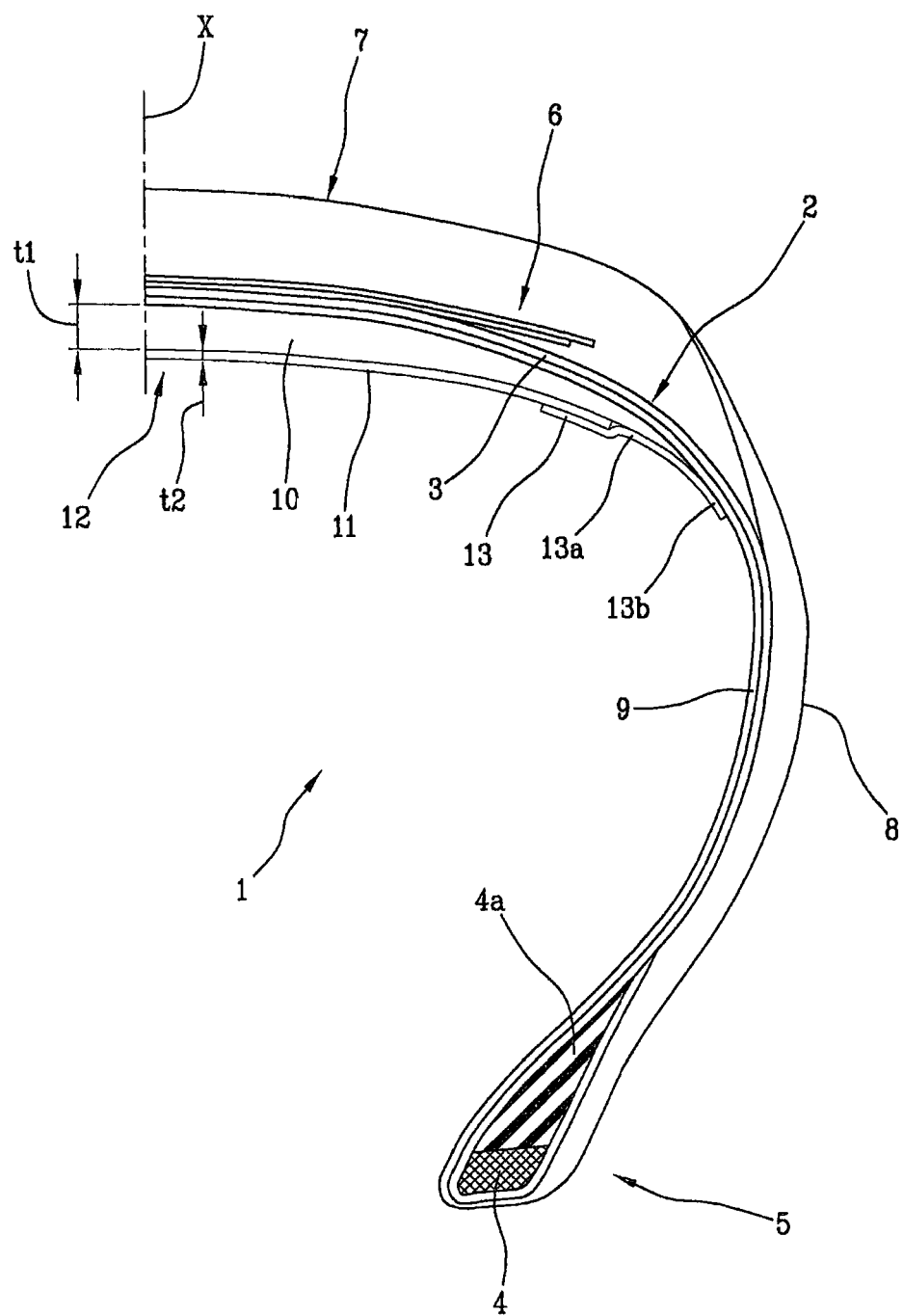
FIG. 1 diagrammatically shows a radial half-section of a self-sealing tyre for vehicle wheels.

Identified in FIG. 1 with reference numeral 1 is a self-sealing tyre for vehicle wheels which generally comprises a carcass structure 2 including at least one carcass ply 3 having respectively opposite end flaps in engagement with respective annular anchoring structures 4, possibly associated with elastomeric fillers 4a, integrated into the regions 5 usually identified as "beads". The carcass ply 3 comprises a plurality of textile or metallic reinforcing cords disposed parallel to each other and at least partly coated with a layer of elastomeric material.

Associated with the carcass structure 2 is a belt structure 6 comprising one or more belt layers placed in radial superposed relationship relative to each other and to the carcass ply 3 and having typically-metallic reinforcing cords. These cords can have a crossed orientation relative to the circumferential extension direction of tyre 1.

A tread band 7 of elastomeric blend, like other semifinished products constituting tyre 1, is applied at a radially external position to the belt structure 6.

In addition, respective sidewalls 8 of elastomeric blend are applied at an axially external position to the side surfaces of the carcass structure 2, each extending from one of the side edges of the tread band 7 until close to the respective annular anchoring structure to the beads 5.

A radially internal surface of tyre 1 is further preferably internally coated with a substantially air-tight layer of elastomeric material, a so-called liner 9.

In the embodiment shown in FIG. 1 tyre 1 is of the type for motor-vehicles.

Typically, in this case the belt structure 6 further comprises at least one radially external layer comprising textile cords disposed at a substantially zero angle relative to the circumferential extension direction of the tyre.

In accordance with alternative embodiments of the present invention, tyre 1 is of the type intended for use on heavy vehicles. The term "heavy vehicle" is generally understood as indicating a vehicle belonging to categories M2~M3, N1~N3 and O2~O4 defined in "Consolidated Resolution of the Construction of Vehicles (R.E.3) (1997)", Annex 7, pages 52-59, "Classification and Definition of Power-Driven Vehicles and Trailers", such as lorries, lorries with trailers, tractors, buses, vans and other vehicles of this type. The belt structure in a tyre for heavy vehicles (not shown) typically comprises a belt layer usually known with the name of "gravel-guard belt" which is the radially outermost layer of the belt structure and acts as a protective layer against penetration of stones and/or gravel into the innermost layers of the tyre structure. Preferably, the belt structure of a tyre for heavy vehicles further comprises a reinforcing side strip that can be radially superposed on the second belt layer, at an axial end thereof. The side strip incorporates a plurality of reinforcing elements, preferably high-elongation metallic cords. Preferably, in addition, an insert is disposed substantially at the shoulder portion, i.e. the portion where the side end of the tread band joins the sidewall. In particular, the insert has a portion that is substantially interposed in a radial direction between the belt structure and tread band and a portion that is substantially interposed in an axial direction between the carcass and sidewall.

In accordance with further embodiments of the present invention, tyre 1 is intended for motorcycles. The outline of the cross section of the tyre for motorcycles (not shown) has a high camber as it must ensure a sufficient footprint area in all inclination conditions of the motorcycle. A camber is defined by the value of the ratio between the distance f of the tread centre from the line passing through the laterally opposite ends of the tread, measured in the equatorial plane of the tyre, and the width C defined by the distance between the laterally opposite ends of the tread. By tyre with a high camber it is denoted a tyre the camber ratio (f/C) of which is of at least 0.20. Preferably (f/C) is respectively comprised between 0.20 to 0.5 for a rear tyre and 0.35 to 0.6 for a front tyre.

The self-sealing tyre 1 according to the invention further comprises a layer of sealing polymeric material 10 disposed at a crown region of tyre 1 and at a radially internal position relative to liner 9. The layer of sealing polymeric material 10 extends over the whole circumferential extension of tyre 1. The layer of sealing material 10 has a maximum thickness "t1" substantially at the equatorial plane "X" of the finished tyre 1, i.e. a cured and molded tyre, and becomes thinner towards the axial ends of the crown region (FIG. 1). Preferably, said maximum thickness "t1" is comprised from about 3 mm to about 6 mm.

The sealing polymeric material for instance comprises 40 phr to 80 phr, preferably 50 phr to 70 phr of a synthetic or natural elastomer, 20 phr to 60 phr, preferably 30 to 50 phr, of an elastomeric block polymer, preferably a styrene-butadiene elastomer (SBR), 40 phr to 60 phr, preferably 50 phr to 60 phr, of process oil; 15 phr to 60 phr, preferably 20 phr to 40 phr, of at least one tackiness agent; and 1 phr to 40 phr, preferably 5 phr to 30 phr, of at least one reinforcing filler.

According to a preferred embodiment, the sealing material can further comprise about 1 phr to about 20 phr of at least one homogenising agent. In a further embodiment, the sealing material can further comprise 0.05 phr to 5 phr of at least one peptizer. According to a preferred embodiment, the synthetic or natural elastomer included in the sealing material can be selected from the commonly used elastomeric materials that can be cross-linked with sulphur, which materials are particularly suitable for tyre production, or from the elastomeric polymers or copolymers with an unsaturated chain, having a glass transition (Tg) temperature generally under 20° C., preferably within the range of 0° C. to 110° C. These polymers or copolymers can be of natural origin or can be obtained through solution polymerisation, emulsion polymerisation or gas-phase polymerisation of one or more conjugated diolefins, optionally mixed with at least one comonomer selected from monovinylarens and/or polar comonomers in an amount not exceeding 60% by weight. The conjugated diolefins generally contain 4 to 12, preferably 4 to 8 carbon atoms and can be for example selected from the group comprising 1,3-butadiene, isoprene, 2,3-dimetyl-1,3-butadiene, 1,3-pentadiene, 1,3-hexadiene, 3-butyl-1,3-octadiene, 2-phenyl-1,3-butadiene, or mixtures thereof. Particularly preferred are 1,3-butadiene or isoprene.

The polar comonomers that may be possibly used can be for example selected from: vinylpiridine, vinylquinoline, acrylic acid and alkylacrylic acid esters, nitriles or mixtures thereof such as methyl acrylate, ethyl acrylate, methyl metacrylate, ethyl metacrylate, acrylonitrile or mixtures thereof.

Preferably, the synthetic or natural elastomer included in the sealing material can be for example selected from: cis-1,4-polyisoprene (natural or synthetic rubber, preferably natural rubber), 3,4-polyisoprene, polybutadiene (in particular polybutadiene with a high 1,4-cis content), possibly halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers or mixtures thereof.

The tackiness agents advantageously used in the present invention can be selected from the group of the hydrocarbon resins having a numerical average molecular weight included between several hundreds and several thousands and providing stickiness when the resin is admixed with natural or synthetic rubber.

As to the resins, different types of synthetic resins can be used. Said numerical average molecular weight (Mn) can be measured following techniques known in the art, such as by gel permeation chromatography (GPC). In particular, resins derived from petroleum, phenol-based resins, carbon-based resins, xylene-based resins and natural resins, rosin-based and terpene-based resins for example, can be used as the tackiness agents.

Examples of commercial products concerning aromatic petroleum-based resins listed by trademark comprise PET-ROSIN produced by MITSUI SEKIYU KAGAKU Co., Ltd., PETRITE produced by MIKUNI KAGAKU Co., Ltd., NEOPOLYMER produced by NIPPON SEKIYU KAGAKU Co., Ltd., and PETCOAL produced by TOYO SODA Co., Ltd.

Examples of phenol-based resins comprise alkylphenol-formaldehyde resins, and rosin-modified derived resins, alkylphenol-acetylene resins, alkylphenol- and terpenephenol-modified resins. Specific examples listed by trademark comprise commercial products such as HITANOL 1502 (produced by HITACHI KASEI Co., Ltd.) which is an alkylphenol novolac resin, RESINA SP-1068 (produced by SI GROUP Inc.) which is an octylphenol-formaldehyde resin, Escorez® 1102 which is an aliphatic tackiness resin (produced by ExxonMobil), and KORESIN (produced by BASF Company) which is a p-t-butylphenol-acetilene resin.

Examples of carbon-based resins include indene cumarone resins. Specific examples comprise commercial products, listed by trademark, such as NOVARES C resins (produced by RUTGERS CHEMICAL GmbH) which are synthetic indene cumarone resins (NOVARES C10, C30 and C70, for example).

Examples of xylene-based resins comprise the xylene-formaldehyde resins.

Said tackiness agents can be used alone or mixed together.

At least one reinforcing filler can be advantageously added to the cross-linkable elastomeric composition referred to above, in an amount generally in the range of 0 phr to 120 phr, preferably 20 phr to 90 phr. The reinforcing filler can be selected from those commonly used for cross-linked products, in particular for tyres, such as carbon black, silica, alumina, aluminosilicates, calcium carbonate, kaolin and mixtures thereof. Particularly preferred are carbon black, silica and mixtures thereof.

According to a preferred embodiment, said carbon black reinforcing filler can be selected from those having a surface area at least as large as 20 m2/g (determined by STSA— Statistical Thickness Surface Area—according to ISO 18852:2005).

At a radially internal position relative to the layer of sealing polymeric material 10 and directly in contact with said layer of sealing polymeric material 10, a polyamide or polyester self-supporting thermoplastic film 11 is disposed. The self-supporting thermoplastic film 11, like the layer of sealing polymeric material 10, extends over the whole circumferential extension of tyre 1 and has a width or axial extension slightly less than the axial extension of said layer 10.

Preferably, said self-supporting thermoplastic film 11 is a polyamide selected from: nylon 6, nylon 66, nylon 46, nylon 11, nylon 12, nylon 610, nylon 612, nylon 6/66 copolymer, nylon 6/66/610 copolymer, nylon MXD 6, nylon 6T, nylon 6/6T copolymer, nylon 66/PP copolymer, nylon 66/PPS copolymer, used alone or in combination thereof.

Preferably, said self-supporting thermoplastic film 11 is of a polyester selected from: polybutylene terephthalate (PBT), polyethylene terephthalate (PET), polyethylene isophtalate (PEI), polybutylene terephthalate/tetramethylene glycol copolymer, PET/PEI copolymer, polyarylate and polybutylene naphthalate. Preferably, the self-supporting thermoplastic film 11 has an elongation at yield greater than 5% and preferably not exceeding 30%. Preferably, the self-supporting thermoplastic film 11 has a yield strength evaluated according to the ASTM D882 standard, comprised from about 20 MPa to about 60 MPa.

Preferably, the self-supporting thermoplastic film 11 has an ultimate elongation greater than 70%. Preferably, the self-supporting thermoplastic film 11 has an ultimate tensile strength comprised from about 20 MPa to about 150 MPa. Preferably, in the finished tyre, said self-supporting thermoplastic film 11 has a thickness "t2" comprised from about 5 µm to about 25 µm. Preferably, in the finished tyre, said self-supporting thermoplastic film has a resistance to puncturing lower than about 30N, preferably lower than about 15N, more preferably lower than about 10N.

The layer of sealing polymeric material 10 and the self-supporting thermoplastic film 11 form a sealing assembly 12. The sealing assembly 12, when a sharp-pointed element (such as a nail) enters the tyre and passes through the layer of sealing polymeric material 10 and the self-supporting thermoplastic film 11, is able to adhere to the object inserted therein and can further flow inside the puncture when said object is removed, thereby sealing the puncture itself and preventing escape of air from the tyre. The sealing assembly 12 is easily pierceable by the sharp-pointed element while maintaining a deformability and stickiness capable of helping in transferring the sealing material during ejection of the sharp-pointed element. At the same time, the thermoplastic film is believed to limit the amount of sealing material transferred into the puncture or hole so that it does not seal holes having sizes greater than a predetermined value, starting from holes caused by sharp-pointed elements of an 8 mm diameter, for example.

Preferably, the tyre further comprises two elongated elements of elastomeric material 13, each disposed at a circumferential edge of the sealing assembly 12. An axially internal portion 13a of each elongated element of elastomeric material 13 overlaps the sealing assembly 12 and is disposed at a radially internal position to said sealing assembly 12. An axially external portion 13b of each elongated element of elastomeric material 13 lies directly in contact with liner 9. By axially internal portion 13a it is intended a portion that is closer to an equatorial plane "X" of tyre 1 than the axially external portion 13b.

In greater detail, the radially internal portion 13a, in turn, has an axially internal region directly applied to the self-supporting thermoplastic film 11 and an axially external region directly applied onto a surface of the layer of sealing polymeric material 10. In fact, the layer of sealing polymeric material 10 has an axial extension greater than the axial extension of the self-supporting thermoplastic film 11. As a result, each elongated element of elastomeric material 13 is directly in contact with both the layer of sealing polymeric material 10 and the self-supporting thermoplastic film 11.

Building of a precursor of a green tyre 1 as above described, inclusive of the sealing assembly 12, is preferably carried out through assembling of respective semi-finished products on one or more forming supports, not shown.

The carcass structure and belt structure are generally made separately from each other at respective work stations, to be then mutually assembled. In greater detail, manufacture of the carcass structure first contemplates formation of the sealing assembly 12 as a continuous ribbon comprising the layer of sealing material 10 disposed on and supported by the self-supporting thermoplastic film 11 joined to the elongated elements of elastomeric material 13 associated with opposite longitudinal edges of said sealing assembly 12 (FIG. 2). Preferably, before embedding of the sealing assembly 12 in the tyre precursor and shaping of same, each elongated element 13 is in direct contact with the self-supporting thermoplastic film 11 over a first width "L1" and with the layer of sealing material 10 over a second width "L2". Said widths are preferably substantially equal to each other.

The sealing layer 10 before embedding of the sealing assembly 12 in the tyre precursor and shaping of same, has a thickness "t3" comprised from about 3 mm to about 6 mm.

The self-supporting thermoplastic film 11 before embedding of the sealing assembly 12 in the tyre precursor and shaping of same has a thickness "t4" smaller than 50 µm and preferably comprised from about 10 µm to about 30 µm.

The sealing assembly 12 provided with the respective elongated elements of elastomeric material 13 is cut to size and wound up around a radially external surface of a building drum, the thermoplastic film 11 being maintained in a radially innermost position. Opposite end flaps of the sealing assembly 12 are mutually spliced by means of adhesive tape, for example.

Liner 9 and the carcass ply or plies 3 are applied onto the sealing assembly 12 so as to form a so-called "carcass sleeve", typically of substantially cylindrical shape. The annular anchoring structures 4 to the beads 5 are fitted or formed on the opposite end flaps of the carcass ply or plies 3 that are subsequently turned up around the annular structures 4 so as to enclose them loop-wise.

Simultaneously, on a second drum or auxiliary drum, a so-called "outer sleeve" is formed which comprises the belt layers 6 applied in radially superposed relationship with each other, and possibly the tread band 7 applied at a radially external position to the belt layer 6. The outer sleeve is then picked up from the auxiliary drum to be coupled to the carcass sleeve. To this aim, the outer sleeve is disposed coaxially around the carcass sleeve and then the carcass ply or plies 3 are shaped into a toroidal configuration by mutual axial approaching of the beads 5 and simultaneous admission of fluid under pressure into the carcass sleeve, so as to determine a radial expansion of the carcass ply 3 until making them adhere against the inner surface of the outer sleeve.

Preferably, after shaping, the thermoplastic film shows a quick stress relaxation so that an excessive elastic stress is prevented from acting and deforming the green tyre or causing separation of the radially inner layers thereof. Preferably the self-supporting thermoplastic film has such a stress relaxation referred to time, that in the 10 first seconds following achievement of an imposed predetermined elongation the thermoplastic film shows a reduction of at least 20% of the stress necessary for maintaining such an imposed elongation.

Preferably, the self-supporting thermoplastic film has such a stress relaxation referred to time that within the 300 seconds following achievement of an imposed predetermined elongation the thermoplastic film shows a reduction of at least 35% of the stress necessary for maintaining such an imposed elongation.

Assembling of the carcass sleeve with the outer sleeve can be carried out on the same drum used for making the carcass sleeve, in which case the process is referred to as "unistage building process" or "unistage process".

Also known are the so-called "two-stage" building processes in which a so-called "first-stage drum" is used for making the carcass sleeve, while assembling between the carcass structure and outer sleeve is carried out on a so-called "second-stage drum" or "shaping drum" onto which the carcass sleeve picked up from the first-stage drum and, subsequently, the outer sleeve picked up from the auxiliary drum are transferred.

After building of the green tyre 1, a curing and molding treatment is carried out which aims at determining the structural stabilisation of tyre 1 through cross-linking of the elastomeric blends as well as impressing the tread band 7 with a desired tread pattern and stamping possible distinctive graphic marks at the sidewalls 8.

During curing, between the elastomer macromolecules a lattice of covalent bonds is created that, depending on the density thereof, prevents flowing of the elastomer, making the material increasingly more insoluble, infusible and elastic. At all events, after curing, the layer of sealing material 10 keeps its deformability and stickiness features.

EXAMPLE

A Pzero Red 235/45R17 Pirelli tyre was made self-sealing by a sealing assembly comprising a sealing composition together with a self-supporting thermoplastic film of nylon Filmon CXS18 of a non-oriented polyamide 6 having a 18 micron thickness. For characterising the thermoplastic film, a tensile stress test was carried out on two test pieces of Filmon CXS18 according to the ASTM D882 standard, under the following test conditions:

test temperature 23° C.
relative humidity 46%
test speed=500 mm/min
test-piece length 12.57 mm
The test results are reproduced in the following table 1.

TABLE 1

| Sample | Ultimate tensile stress (Mpa) | Ultimate elongation (%) |
|---|---|---|
| 1 | 53.82 | 172.48 |
| 2 | 59.58 | 192.45 |

A stress relaxation test was also carried out on a sample of Filmon CXS18 that, being measured, had the following sizes 200 mm×20 mm. The test piece was conditioned for 24 hours at 23° C. and 45% of relative humidity.

The test was carried out by a Zwic dynamometer model 1445 and the stress relaxation values found were the following.

For a test carried out with 130% elongation:
Stress relaxation of 32% after 10 seconds;
Stress relaxation of 48% after 300 seconds;
For a test carried out with 110% elongation:
Stress relaxation of 30% after 10 seconds;
Stress relaxation of 45% after 300 seconds.

Tests were also made for resistance to puncturing on a sample of Filmon CXS 50 of 50 microns. The samples showed values of resistance to puncturing of 9.3N and 22N respectively, measured under the following conditions:

T=23° C.
relative humidity=50%
Diameter of the rounded point=2 mm
Test speed=500 mm/min.

The sealing composition of the following table 2 was used for preparing the sealing layer.

TABLE 2

| | |
|---|---|
| IR | 60 |
| SBR | 40 |
| Peptizer | 0.5 |
| Process oil | 55 |
| Escorez ® 1102 | 40 |
| Struktol ® 40MS | 7 |
| N326 | 15 |

In the preceding table 2:
IR is a cis-1,4-polyisoprene elastomer produced by Nizhnekamskneftechim Export, Russia;
SBR is a styrene-butadiene elastomer copolymer cross-linked with divinyl benzene produced by International Specialty Products (ISP);
Peptizer is PEPTON 66 produced by Anchor Chemical Ltd, UK;
Process oil (selected from MES=Mild Extraction Solvates) is a mineral base oil solvent-refined and/or refined by hydrotreatment to a high degree (Catenex SNR produced by Shell);
Escorez® 1102 is an aliphatic tackiness resin produced by ExxonMobil;
Struktol® 40 MS is a blend of aromatic aliphatic naphthenic hydrocarbon resins (Struktol Corporation);
N326 is carbon black.

The layer of sealing material before building of the tyre had a thickness of about 4.0 mm and the sealing assembly was disposed at a radially internal position to the liner (as shown in FIG. 1).

The cured and molded tyres were mounted on a standard rim and inflated to a 2.4 bar pressure.

Static Sealing Tests

1) Nails of a 3, 4, 5, 8 and 10 mm diameter and 40 mm long were radially inserted through the tread of a tyre inflated to a 240 kPa pressure. The tread region to be punctured corresponded to the belts. The nail arrangement included blocks and grooves and was random on the circumference.

2) The inserted nails were extracted and the possible air escape was controlled using a soapy water solution.

Dynamic Tests

1) Nails of a 3, 4 and 5 mm diameter and 40 mm long were inserted through the tread of a tyre inflated to a 240 kPa pressure. The tread region to be punctured corresponded to the belts. The nail arrangement included blocks and grooves and was random on the circumference.

The casing was set in a rolling movement with the inserted nails on a so-called "roller test bench", a disc of a 2.8 m diameter, at the speed of 120 km/h with a load of 550 kg.

2) First 200 km were covered and then as far as 500 km with a tyre and 750 km with another tyre alternating periods of 10 minutes with a zero slip angle with periods of 10 minutes with a slip angle oscillating between −6° and +6°. The slipping speed was 1°/s==>for each slip cycle 25 oscillations were carried out. Air did not escape through the casings over the whole test period (200, 500 or 750 km).

3) The inserted nails were extracted and 20 km were covered with a load of 550 kg and a slip angle oscillating between −2° to +2°. The air escape through the punctures was checked with a solution of soapy water.

The obtained results are summarised in the following tables 3 and 4 bearing both the number of nails for each diameter and the number of sealings obtained in percent and as the total number.

TABLE 3

Dynamic Tests

| | diameter of the inserted nails | | |
|---|---|---|---|
| | 3 mm | 4 mm | 5 mm |
| Sealing at 200 km | | | |
| No. of the inserted nails | 6 | 4 | 3 |
| No. of sealed punctures after extraction | 6 | 4 | 3 |
| sealing % | 100 | 100 | 100 |
| Sealing at 500 km | | | |
| No. of the inserted nails | 10 | 4 | 3 |
| No. of sealed punctures after extraction | 10 | 4 | 2 |
| sealing % | 100 | 100 | 66.7 |
| Sealing at 750 km | | | |
| No. of the inserted nails | 12 | 12 | 12 |
| No. of sealed punctures after extraction | 12 | 10 | 10 |
| sealing % | 100 | 83.3 | 83.3 |

TABLE 4

Static sealing tests with nails of 8 and 10 mm

| | |
|---|---|
| two 8 mm punctures | air escape |
| two 10 mm punctures | air escape |

Control Test

A P7 235/45R17 Pirelli tyre was made self-sealing by arranging, on the substantially air-tight radially innermost layer, a sealing layer of a thickness of about 4 mm comprising the sealing composition of said table 2 not associated with any film.

The tyre thus made was submitted to a static sealing test. Nails of a 8 and 10 mm diameter and 40 mm long were inserted radially, through the tread of a tyre inflated to a pressure of 240 kPa. The tread region to be punctured corresponded to the belts and arrangement of the nails took place in the grooves and was random on the circumference.

The inserted nails were extracted and the possible air escape was controlled with a soapy water solution.

The results are reproduced in the following table 5.

TABLE 5

Static sealing tests with nails of 8 and 10 mm on a self-sealing tyre without thermoplastic film

| | |
|---|---|
| two 8 mm punctures | No air escape |
| two 10 mm punctures | No air escape |

It was possible to see that the tyre made in accordance with the invention has allowed a selective control of the sealing even under conditions of greater hard use of the tyre.

In fact the sealing was excluded already in the test carried out under static conditions, for punctures caused by sharp-pointed elements of sizes (8 mm and 10 mm) considered as potentially dangerous in accordance with the Applicant's experiences.

The invention claimed is:

1. A method of selectively controlling the self-sealing ability of a tyre comprising:
arranging a sealing assembly on a drum; subsequently,
forming a precursor of a green tyre inclusive of at least one liner and a carcass on said sealing assembly; and subsequently,
shaping, moulding and curing the combined sealing assembly and tyre precursor, said sealing assembly comprising:
   i. a self-supporting thermoplastic film of a polyamide or polyester material; and
   ii. a layer of sealing material possessing viscoelastic and stickiness features, which is associated with and supported by said self-supporting thermoplastic film,
wherein said self-supporting thermoplastic film, after curing, has a thickness greater than 5 µm and less than 25 µm,
said sealing material comprises 30 phr to 50 phr of an elastomeric block copolymer or a styrene-butadiene elastomer and 40 phr to 60 phr of process oil, and
said sealing assembly being easily puncturable by a sharp-pointed element while maintaining such a deformability and stickiness that it contributes to transfer of the sealing material during ejection of the sharp-pointed element and limits the transferred amount thereof to such an extent that holes bigger than a predetermined value are not sealed.

2. The method as claimed in claim 1, wherein said self-supporting thermoplastic film comprises a polyamide selected from: nylon 6, nylon 66, nylon 46, nylon 11, nylon 12, nylon 610, nylon 612, nylon 6/66 copolymer, nylon 6/66/610 copolymer, nylon MXD 6, nylon 6T, nylon 6/6T copolymer, nylon 66/PP copolymer, nylon 66/PPS copolymer, and mixtures thereof.

3. The method as claimed in claim 1, wherein said self-supporting thermoplastic film comprises polyester selected from: polybutylene terephthalate, polyethylene terephthalate, polyethylene isophtalate, polybutylene terephthalate/tetramethylene glycol copolymer, polyethylene terephthalate/polyethylene isophthalate copolymer, polyarylate, and polybutylene naphthalate.

4. The method as claimed in claim 1, wherein the self-supporting thermoplastic film has an elongation at yield greater than 5%.

5. The method as claimed in claim 1, wherein the self-supporting thermoplastic film has a yield strength from about 20 MPa to about 60 MPa.

6. The method as claimed in claim 1, wherein the self-supporting thermoplastic film has an ultimate elongation greater than 70%.

7. The method as claimed in claim 1, wherein the self-supporting thermoplastic film has an ultimate tensile strength from about 20 MPa to about 150 MPa.

8. The method as claimed in claim 1, wherein the self-supporting thermoplastic film has such a stress relaxation relative to time, that in 10 seconds following achievement of an imposed elongation of 110% to 150%, the thermoplastic film shows a reduction of at least 20% of stress necessary for maintaining such an imposed elongation.

9. The method as claimed in claim 1, wherein the self-supporting thermoplastic film has such a stress relaxation relative to time that within 300 seconds following achievement of an imposed elongation of 110% to 150%, the thermoplastic film shows a reduction of at least 35% of stress necessary for maintaining such an imposed elongation.

10. The method as claimed in claim 1, wherein said self-supporting thermoplastic film, before shaping, has a thickness smaller than 50 µm.

11. The method as claimed in claim 1, wherein said self-supporting thermoplastic film, before shaping, has a thickness from about 10 µm to about 30 µm.

12. The method as claimed in claim 1, wherein said layer of sealing material, before shaping, has a thickness less than about 6 mm.

13. The method as claimed in claim 1, wherein said layer of sealing material, before shaping has a thickness greater than about 3 mm.

14. The method as claimed in claim 1, wherein the sealing material comprises:
   50 phr to 70 phr of a synthetic or natural elastomer material excluding an elastomeric block copolymer or a styrene-butadiene elastomer;
   30 phr to 50 phr of an elastomeric block copolymer, or a styrene-butadiene elastomer;
   40 phr to 60 phr of process oil;
   15 phr to 60 phr of at least one tackiness agent; and
   1 phr to 40 phr of at least one reinforcing filler.

15. The method as claimed in claim 1, wherein the sealing material comprises:
   50 phr to 70 phr of a synthetic or natural elastomer material excluding an elastomeric block copolymer or a styrene-butadiene elastomer;
   30 phr to 50 phr of an elastomeric block copolymer, or a styrene-butadiene elastomer;
   50 phr to 60 phr of process oil;
   20 phr to 40 phr of at least one tackiness agent; and
   5 phr to 30 phr of at least one reinforcing filler.

16. The method as claimed in claim 1, wherein said sealing layer has a maximum thickness less than about 6 mm and greater than about 2.5 mm.

17. The method as claimed in claim 1, wherein, after curing, said self-supporting thermoplastic film has a resistance to puncturing less than about 30N.

18. The method as claimed in claim 1, wherein, after curing, said self-supporting thermoplastic film has a resistance to puncturing less than about 15N.

* * * * *